United States Patent [19]
Hirano

[11] Patent Number: 5,443,570
[45] Date of Patent: Aug. 22, 1995

[54] HANDLE FOLDING DEVICE FOR FISHING REEL

[75] Inventor: Kazuo Hirano, Tokyo, Japan

[73] Assignee: Daiwa Seiko, Inc., Tokyo, Japan

[21] Appl. No.: 200,574

[22] Filed: Feb. 22, 1994

Related U.S. Application Data

[63] Continuation of Ser. No. 850,807, Mar. 13, 1992, abandoned.

[30] Foreign Application Priority Data

Mar. 20, 1991 [JP] Japan .................. 3-024322 U
Mar. 20, 1991 [JP] Japan .................. 3-024323 U

[51] Int. Cl.⁶ ............................................. A01K 89/00
[52] U.S. Cl. .................................................. 242/284
[58] Field of Search .................. 242/284; 74/546, 547

[56] References Cited

U.S. PATENT DOCUMENTS

| | | | |
|---|---|---|---|
| 1,191,855 | 7/1916 | Tuszka | 74/547 |
| 4,253,618 | 3/1981 | Beraut | 74/547 |
| 4,437,621 | 3/1984 | Sakumoto | 242/284 |
| 4,524,921 | 6/1985 | Ozaki et al. | 74/574 |
| 4,588,141 | 5/1986 | Uetsuki et al. | 242/284 |

FOREIGN PATENT DOCUMENTS

| | | | |
|---|---|---|---|
| 255469 | 4/1988 | Germany | 242/284 |
| 59-42871 | 12/1984 | Japan . | |
| 60-12972 | 1/1985 | Japan . | |
| 62-10620 | 3/1987 | Japan . | |

Primary Examiner—Daniel P. Stodola
Assistant Examiner—Eileen A. Dunn
Attorney, Agent, or Firm—Longacre & White

[57] ABSTRACT

A handle folding device for a fishing reel having a handle arm for manual rotation and a handle shaft for transmitting the manual rotation to a spool. A handle arm is pivotably supported onto the handle shaft so as to be pivoted between an up-standing position and a folded position. The handle arm in the up-standing position is retained relative to the handle shaft by the engagement between a step portion of the handle shaft and a handle stopper pivotably mounted on the handle arm. The handle arm in the folded position is also retained relative to the handle shaft by the engagement between the handle stopper and a recess formed on the handle shaft. Since the handle arm can be surely retained in its folded position as well as in its up-standing position, many advantages are produced in carrying the fishing reel by a fisherman, accommodating the fishing reel within a case in a manufacturing line, and so on.

19 Claims, 8 Drawing Sheets

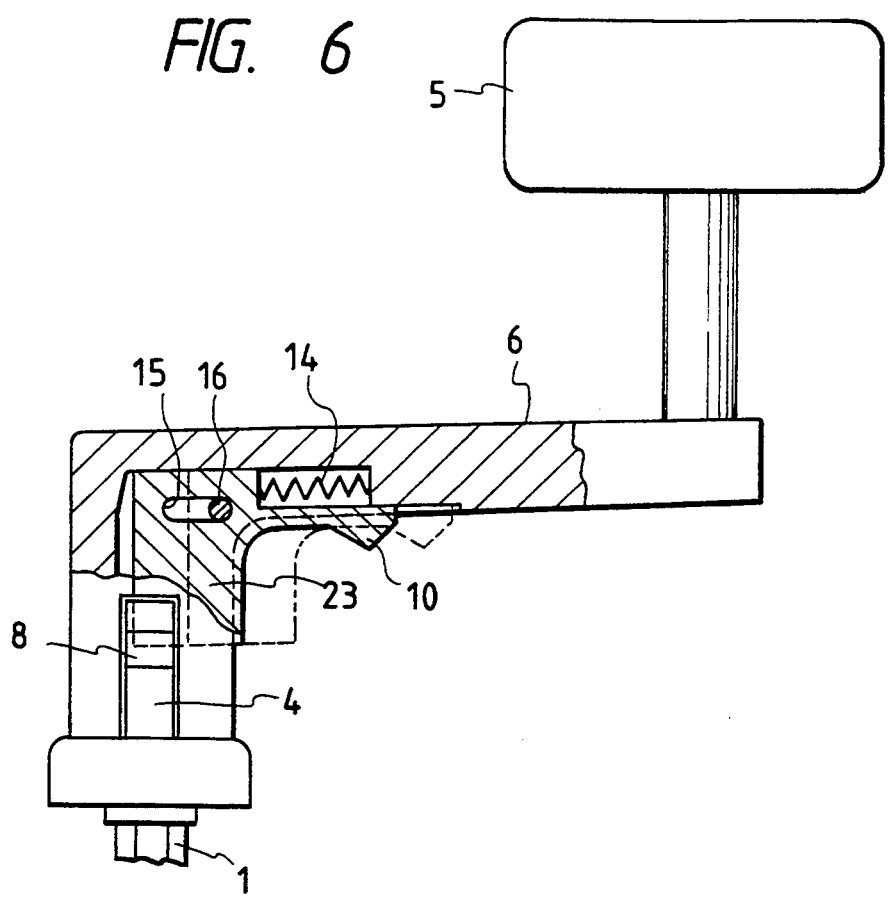
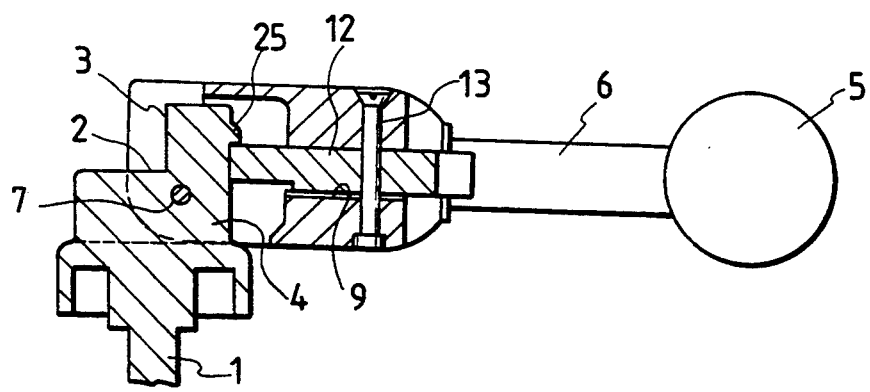

HANDLE FOLDING DEVICE FOR FISHING REEL

This is a continuation of application Ser. No. 07/850,807, filed Mar. 13, 1992, which was abandoned upon the filing hereof.

BACKGROUND OF THE INVENTION

The present invention relates to a handle folding device for a fishing reel, and more particularly, to a device capable of folding a handle provided in a fishing reel with an improved manner.

In a conventional fishing reel, a handle arm is arranged to be capable of being folded relative to a handle shaft for the portable property and the accommodation in a case. Japanese Utility Model Examined Publication No. Sho. 59-42871 discloses a handle arm capable of being folded relative to a handle shaft in an imaginary plane defined by the handle shaft and the handle arm before folded. Also, Japanese Patent Examined Publication No. Sho. 62-10620 and Japanese Utility Model Unexamined Publication No. Sho. 60-12972 disclose a handle arm capable of being folded perpendicularly to the imaginary plane by operating a handle stopper.

The folding manner according to the above-noted publications, however, suffers from a problem in that the folded handle arm is likely to be moved from its folded position. Especially, even if the handle arm is folded after the handle arm is rotated to a desired position for the purpose of making the fishing reel compact as a whole, the handle arm is likely to be moved from its folded position as noted above and further be returned to its original position when a person carries the fishing reel and/or touches the folded handle arm. This is inconvenient in carrying the fishing reel, and this makes it troublesome to accommodate the fishing reel within a case in a manufacturing line.

SUMMARY OF THE INVENTION

The present invention was made in order to solve the above-mentioned problem.

An object of the present invention is to provide a handle folding device for a fishing reel, in which a handle arm can be surely maintained at its folded position with a simple arrangement.

In order to attain the above-noted and other objects, the present invention provides a handle folding device adapted to a fishing reel having a handle arm for manual rotation and a handle shaft for transmitting the manual rotation to a spool, the folding device, which comprises first means for allowing the handle arm to be pivoted between first and second positions relative to the handle shaft; second means for retaining the handle arm in the first position for use; and third means for retaining the handle arm in the second position for accommodation.

The present invention further provides a handle folding device for a fishing reel, comprising: a handle shaft; a projecting portion formed on one end of the handle shaft and S provided with an engagement portion; a handle arm pivotably supported onto the projecting portion; a handle stopper movably mounted on the handle arm and selectively engaged with and disengaged from the engagement portion to allow the handle arm to be folded relative to the handle shaft; and retaining means provided between the projecting portion and the handle stopper for retaining the handle arm in place when the handle arm is folded relative to the handle shaft.

The retaining means for retaining the handle arm in place when the handle arm is folded relative to the handle shaft may be provided between the handle shaft and the handle arm.

BRIEF DESCRIPTION OF THE DRAWINGS

In the accompanying drawings:

FIG. 6 is a longitudinally sectional view showing a third embodiment of the handle folding device similar to the first embodiment;

FIG. 7 is a cross-sectional view showing yet another embodiment of the handle folding device similar to the first embodiment;

DETAILED DESCRIPTION OF THE PREFERRED EMBODIMENTS

A handle folding device similar to a first embodiment of the present invention will now be described with reference to FIGS. 1 to 3.

The handle folding device is adapted to be used for a spinning reel having a handle arm 6 for manual rotation by a fisherman and a handle shaft 1 connected to gear means provided in a body of the spinning reel for transmitting the manual rotation to a spool.

Figure 3:
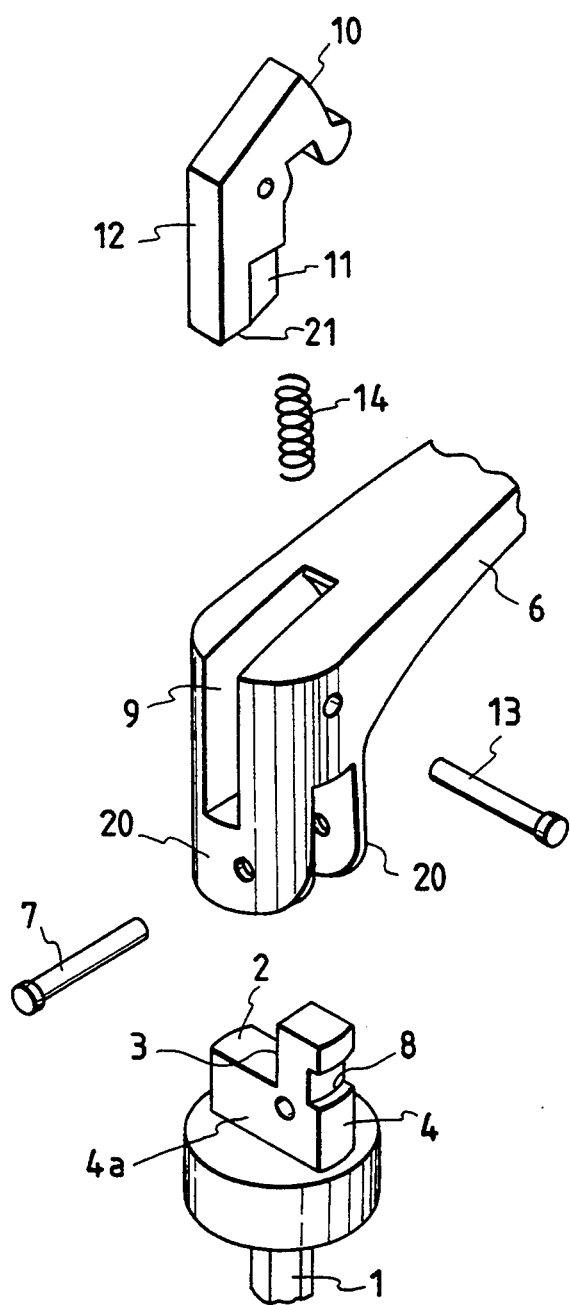
FIG. 3 is an exploded perspective view showing the handle folding device.

As best shown in FIG. 3, one end of the handle shaft 1 is formed into a projecting portion 4 in an integral manner. The projecting portion 4 includes a notched step 2 and a tapered engagement portion 3 formed on an up-standing portion of the step 2. The projecting portion 4 further includes a retaining recess portion 8 formed on that portion opposite to the tapered engagement portion 3.

On the other hand, the handle arm 6 includes a knob 5 mounted onto one end thereof. The other end of the handle arm 6 is formed into a bent portion which includes spaced portions 20 and 20' in the form of fork, and a slit portion 9.

The spaced portions 20 and 20' provided on the end of the handle arm 6 is fitted onto the projecting portion 4 of the handle shaft 1 and then supported to the latter by a pin 7. Therefore, the handle arm 6 can be pivoted around the pin 7 and folded relative to the handle shaft 1. More specifically, by virtue of configuration of the projecting portion 4 and the spaced portions 20 and 20' and the axial support by the pin 7, the handle arm 6 can be pivoted from its up-standing position to its folded position in a direction indicated by an arrow shown in FIG. 2, and vice versa.

A handle stopper 12 is inserted into the slit portion 9 formed in a portion of the handle arm 6 where the handle arm 6 is bent, and the former is supported to the latter by a pin 13 so as to be pivotable about the pin 13. The handle stopper 12 has an operating portion 10 at its upper end. A side portion of the handle stopper 12 is formed into another engagement portion 11 which slidingly contacts the engagement portion 3 of the projecting portion 4. The handle stopper 12 is biased by a spring 14 so that the operating portion 10 is projected upwardly from the slit portion 9. The handle stopper 12 further includes a retaining portion 21, which is a lower end of the stopper 12.

The operation of the handle folding device similar to the first embodiment of the present invention will now be described.

Figure 2:
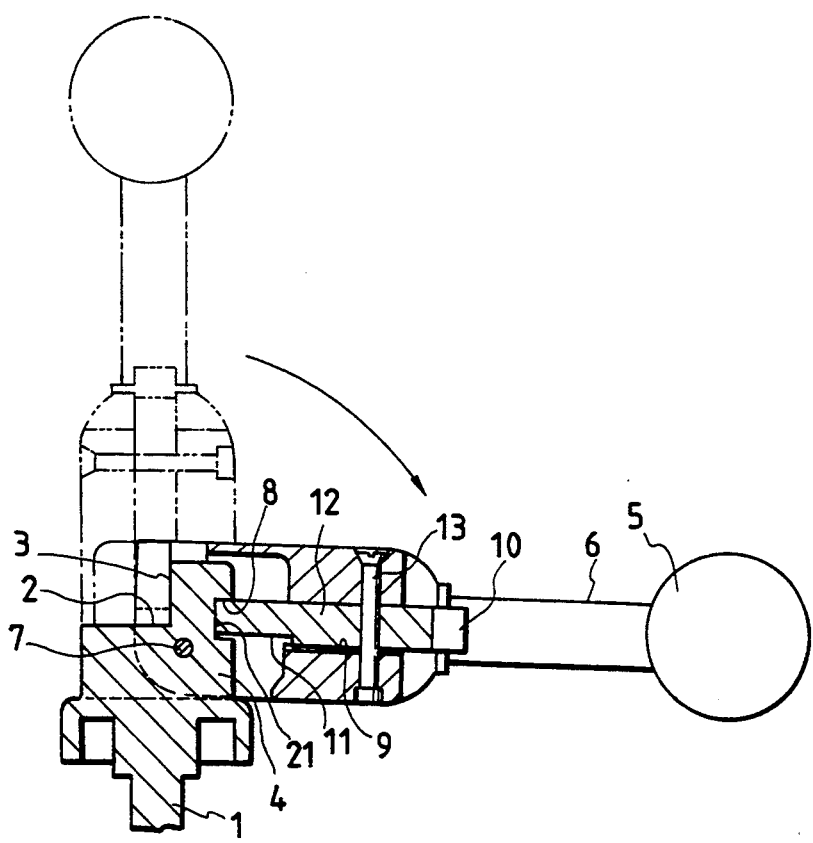
FIG. 2 is a cross-sectional view taken along line II—II in FIG. 1 in a state that the handle arm is retained in its folded position.

In the up-standing position of the handle arm 6 as indicated by two-dotted chain line in FIG. 2, the engagement portion 11 of the handle stopper 12 is in surface-contact with the tapered engagement portion 3 of the handle shaft 4, and the spring 14 prevents the pivotable movement of the handle stopper 12 about the pin 13, so that the handle arm 6 is prevented from being pivoted about the pin 7. Therefore, the handle arm 6 can be surely maintained at its up-standing position.

Figure 1:
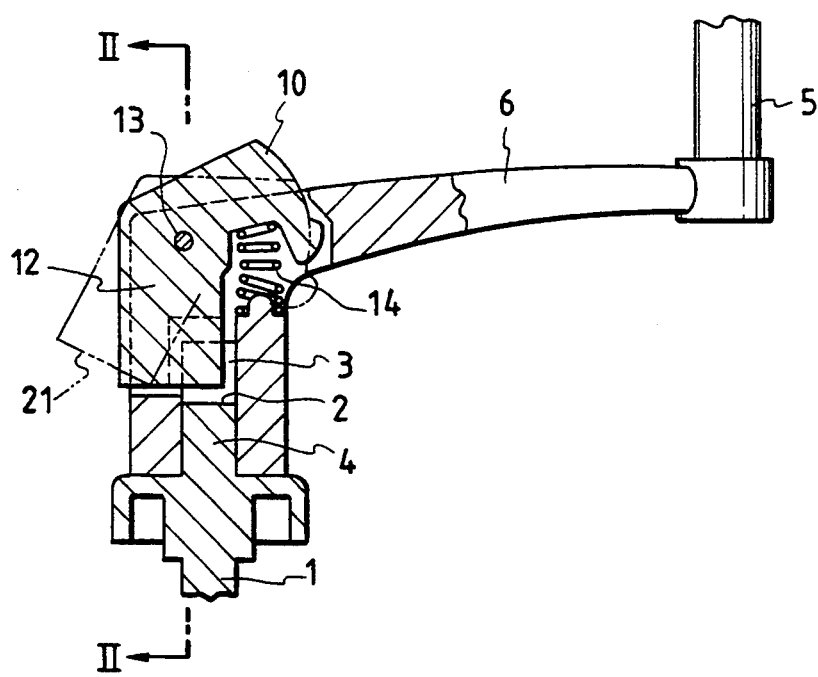
FIG. 1 is a longitudinally sectional view showing a handle folding device according to a first embodiment of the present invention in a state that a handle arm is retained in its up-standing position.

Then, by depressing the operating portion 10 of the handle stopper 12 against the biasing force of the spring 14, the handle stopper 12 is pivotably rotated about the pin 13, the engagement portion 11 of the handle stopper 12 is slidingly moved relative to the tapered engagement portion 3 of the handle shaft 1, and the engagement portion 11 is disengaged from the tapered engagement portion 3 as shown by two-dotted chain line in FIG. 1, so that the handle arm 6 can be rotated around the pivot pin 7 and folded relative to the handle shaft 1.

In that state where the handle arm 6 is folded, the retaining portion 21 of the handle stopper.12 are brought into engagement with the retaining recess 8 of the projecting portion 4 due to the biasing force of the spring 14. Therefore, the handle arm 6 can be surely maintained at its folded position.

In addition, the handle arm 6 can be retained in its folded position or its up-standing position in conjunction with pivot movement thereof between its up-standing position and its folded position since the handle stopper 12 is slidingly in contact with a surface 4a of the projecting portion 4 during the pivot movement of the handle arm 6 until its up-standing position or folded position once the handle stopper 12 is disengaged from the engagement portion 3 or retaining recess portion 8 and is slightly pivoted.

Figure 4:
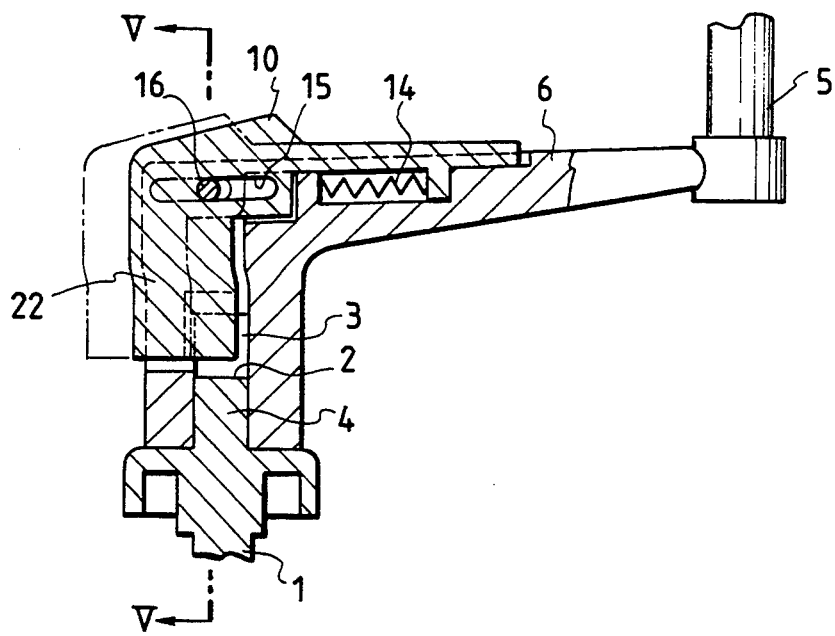
FIG. 4 is a longitudinally sectional view showing a second embodiment of the handle folding device similar to the first embodiment in a state that a handle arm is retained in its up-standing position.
Figure 5:
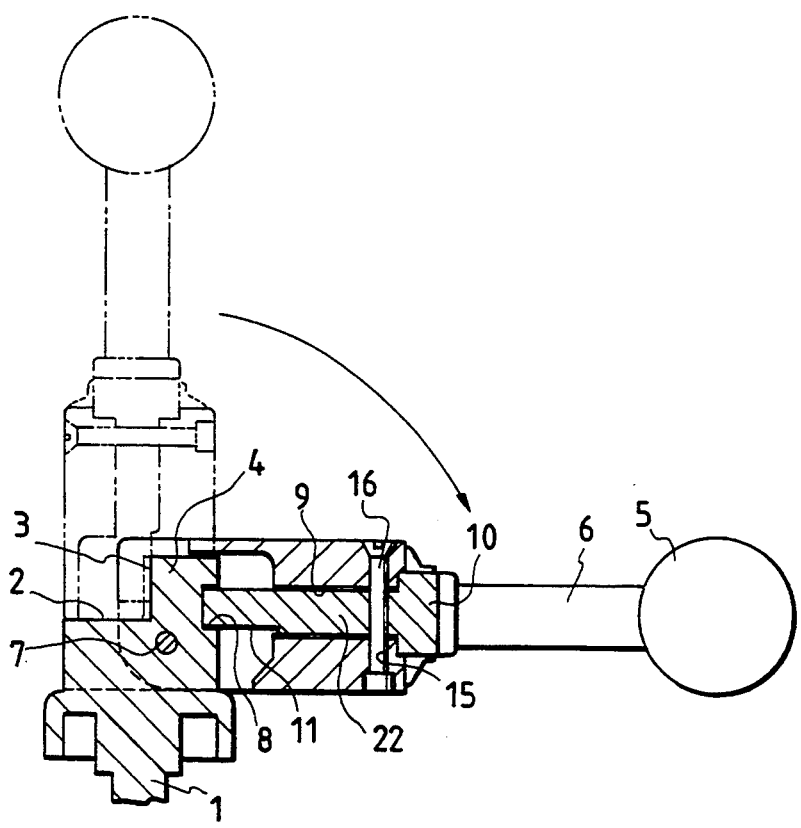
FIG. 5 is a cross-sectional view taken along line V—V in FIG. 4 in a state that the handle arm is retained in its folded position.

FIGS. 4 and 5 show a modified embodiment of the handle folding device similar to the first embodiment of the present invention. Instead of the pivotable handle stopper 12, there is provided a handle stopper 22 which is slidingly movable relative to the handle arm 6. The handle stopper 22 is supported to the slit portion 9 of the handle arm 6 through a pin 16 secured to the slit portion 9 and an elongated hole 15 formed in the handle stopper 22. Accordingly, the handle stopper 22 can be engaged with and disengaged from the engagement portion 3 and the retaining portion 8 by virtue of the sliding motion of the handle stopper 22.

FIG. 6 show another modified embodiment of the handle folding device similar to the first embodiment of the present invention, where a handle stopper 23 of the sliding type is provided inside the handle arm 6.

Figure 8:
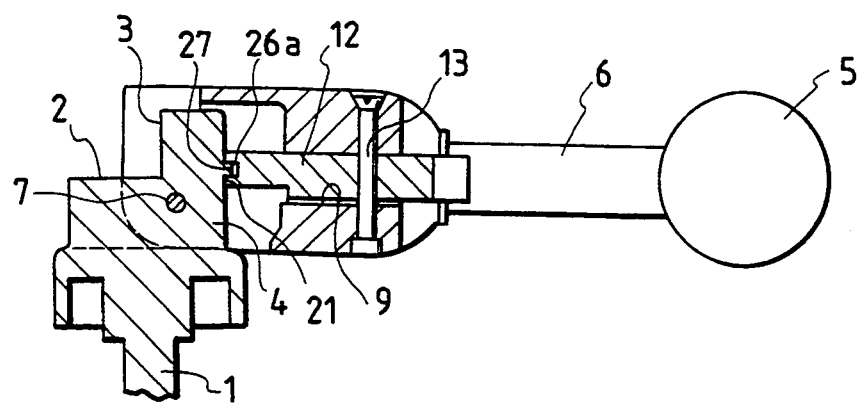
FIG. 8 is a cross-sectional view showing still another embodiment of the handle folding device similar to the first embodiment.

In the first embodiment of the present invention, the retaining recess portion 8 is formed on the projecting portion 4 of the handle shaft 1, but the present invention should not be restricted thereto or thereby. For example, as shown in FIG. 7, a projection 25 may be formed on the portion 4 of the handle shaft 1 in order to retain the handle arm 6 in its folded position. Also, as shown in FIG. 8, a projection 27 and a recess 26a may be formed on the portion 4 and the portion 21, respectively.

Figure 9:
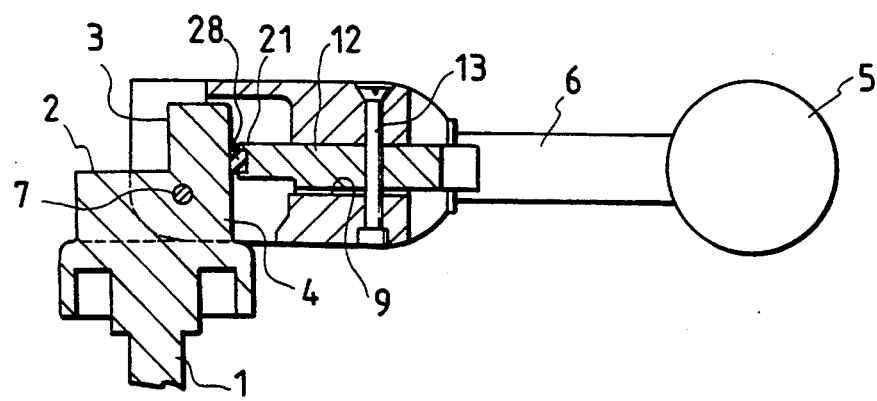
FIG. 9 is a cross-sectional view showing a further embodiment of the handle folding device similar to the first embodiment.
Figure 10:
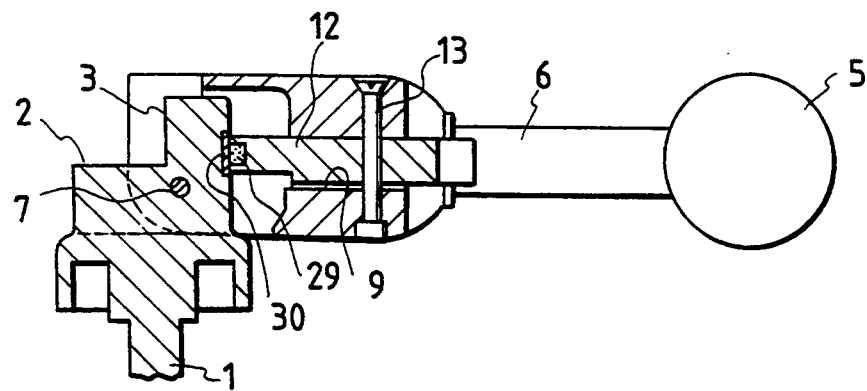
FIG. 10 is a cross-sectional view showing a still further embodiment of the handle folding device similar to the first embodiment.

Further, in the above-mentioned handle folding devices, the engagement of the projection-like portion with the recess-like portion is utilized for retaining the handle arm 6 in its folded position. However, the present invention should not be restricted thereto or thereby. For example, a member 28 having a large frictional coefficient, such as rubber or the like may be fixedly attached to the portion 21 of the handle stopper 12 as shown in FIG. 9. In the handle folding device shown in FIG. 9, the handle arm 6 can be retained in its folded position by the frictional force between the member 28 and the portion 4. Further, the handle arm 6 can be shifted from its folded position to its original position, i.e. up-standing position without manually depressing the handle stopper 12 against the biasing force of the spring 14. Also, a magnet 29 and a magnetized plate 30 may be fixedly attached to the portion 21 and the portion 4, respectively, so that the handle arm 6 can be retained in its folded position by the magnetic force of the magnet 29 and returned from its folded position and to its up-standing position without manually depressing the spring-biased handle stopper 12. According to these handle folding device shown in FIGS. 9 and 10, even if the fishing reel must be used in a condition that dust, foreign substance, mucus of the fish, or the like are apt to be adhered thereto, the dust, foreign substance, mucus of the fish never hinder the handle folding device since retaining means for retaining the handle arm in its holded position can dispense with a recess portion which is likely to be clogged up with such dust foreign substance, mucus of the fish or the like.

In addition, when the handle stopper is used both as first means for retaining the handle arm in its up-standing position and second means for retaining the handle arm in its folded position as of the first embodiment, the handle folding device can be arranged for a fishing reel with an extremely simple construction, and the handle arm can be surely maintained at the both positions without any undersired swinging of the handle arm.

A handle folding device according to yet another embodiment of the present invention will be explained with reference to FIGS. 11 and 12.

A projecting portion 34 is integrally provided on an outer end of a handle shaft 31 of a reel and projected therefrom. The projecting portion 34 has a notched step 32 and is formed with a tapered engagement portion 33 at a standing portion of the notched portion 32. Front and rear spaced portions 36' and 36' are formed on a bent proximal end of the handle arm 36 having a knob 5. The spaced portions 36' and 36' in the form of fork are fitted onto the projecting portion 34 and pivotably supported thereto by a pin 37 so that the handle arm 36 can be folded perpendicularly to an imaginary plane defined by handle shaft 31 and the handle arm 36 before being folded.

A slit portion 38 is formed in that portion of the handle arm 36 where the handle arm 36 is bent. A handle stopper 41 is pivotably supported to the slit portion 38 by a pin 42. The handle stopper 41 is provided at its upper end with an operating portion 39 and at one side thereof with an engagement portion 40 which slidingly contacts the engagement portion 33. The handle stopper supported to the slit portion 38 is biased by a spring 43 so that the operating portion 39 is projected from an upper surface of the handle arm 36.

Figure 11:
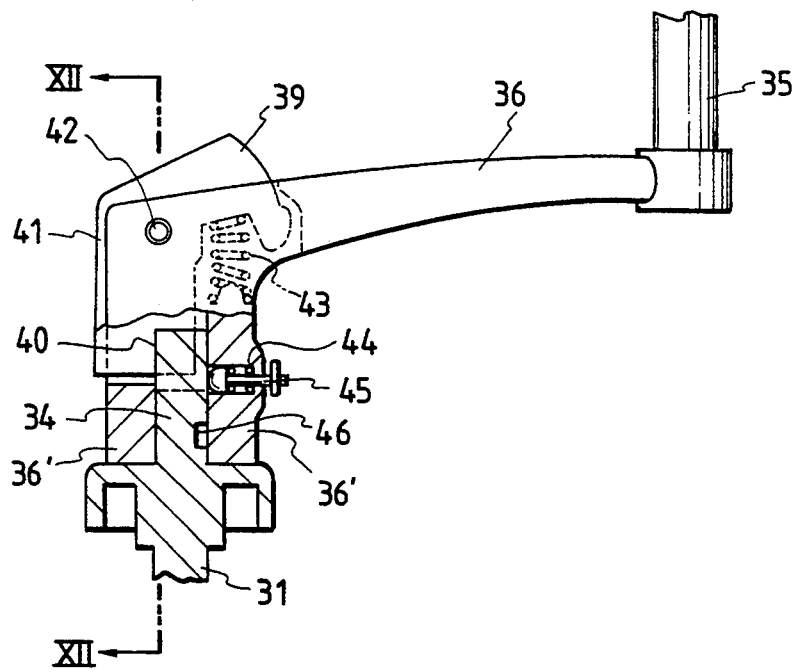
FIG. 11 is a longitudinally sectional view showing a handle folding device according to another embodiment of the present invention in a state that a handle arm is retained in its up-standing position.

A retaining member 45 is provided in the rear spaced portion 36' and biased leftward in FIG. 11 by a spring 44. Further, a retaining recess 46 is provided on the projecting portion 44 so as to be confronted with a rounded surface of the retaining member 45 when the handle arm 36 is folded. Therefore, the retaining member 45 can be engaged with the retaining recess 46 due to the biasing force of the spring 44 when the handle arm 46 is pivoted to its folded position.

According to the above-noted arrangement, the handle arm 36 is retained in its up-standing position relative to the handle shaft 31 when the engagement portion 40 of the handle stopper 41 is kept in pressure-contact with the engagement portion 33 of the projecting portion 34. Therefore, a fisherman can rotates the handle arm 36 through the knob 35 to drive a spool through the handle shaft 31 or the like.

When the operating portion 39 of the handle stopper 41 is depressed in order to disengage the engagement portion 40 of the handle stopper 41 from the engagement portion 33 of the handle shaft 31, the handle arm 36 is allowed to be pivoted perpendicularly to the imaginary plane defined by the handle shaft 31 and the handle arm 36 of the up-standing position. Thereafter, when the handle arm 36 is pivoted to its folded position, the spring-biased retaining member 45 is brought into engagement with the retaining recess 46, thereby retaining and holding the handle arm 36 in its folded position.

Figure 12:
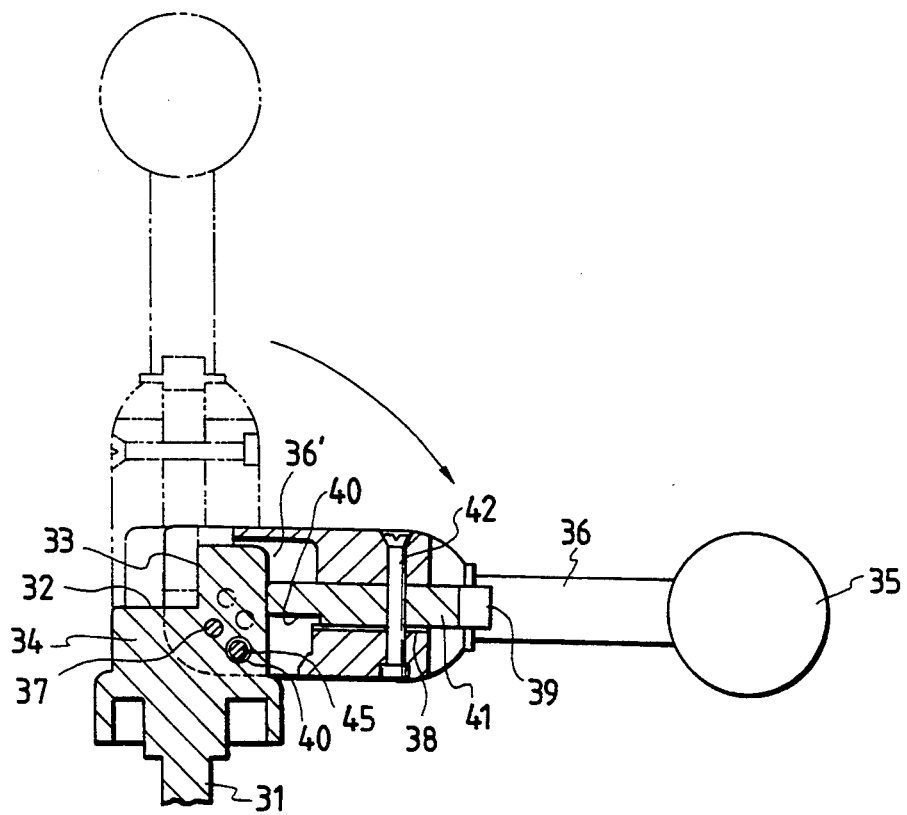
FIG. 12 is a cross-sectional view taken along line XII—XII in FIG. 11 in a state that a handle arm is retained in its folded position.

In a case where the handle arm is returned from its folded position to its up-standing position, it is only that the folded handle arm 36 is forcibly pivoted in a direction opposite to that indicated by an arrow in FIG. 12 since the engagement between the retaining member 45 and the retaining recess 46 are released against the biasing force of the spring 44 by virtue of the rounded surface of the retaining member 45.

It is preferable that the biasing force of the spring 44 is set at such a degree that the engagement between the retaining member 45 and the retaining recess 46 can be released by merely pivoting the handle arm 36 from its folded position. However, the retaining member 45 may be designated to be disengaged from the retaining recess 46 by manually operating the retaining member 45.

Figure 13:
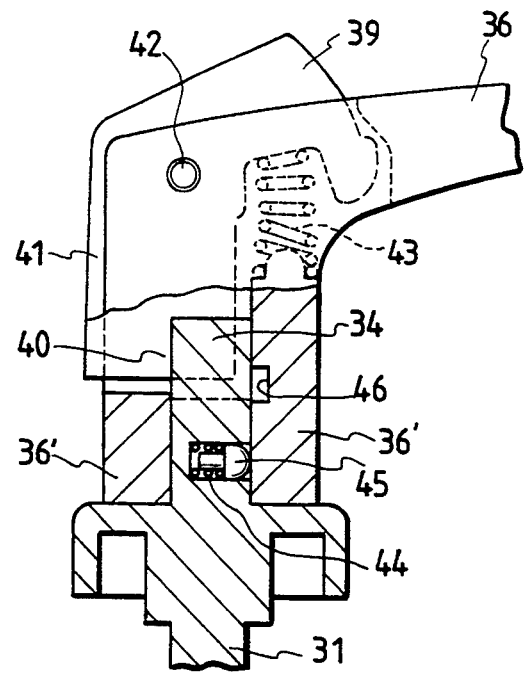
FIG. 13 is a longitudinally sectional view showing a modified embodiment of the handle folding device similar to the embodiment of FIG.11.

In the handle folding device shown in FIGS. 11 and 12, the retaining member 45 and the retaining recess 46 are provided in the handle arm 36 and the handle shaft 31, respectively, but the retaining member 45 and the retaining recess 46 may be provided in the handle shaft 31 and the handle arm 36, respectively, as shown in FIG. 13.

Figure 14:
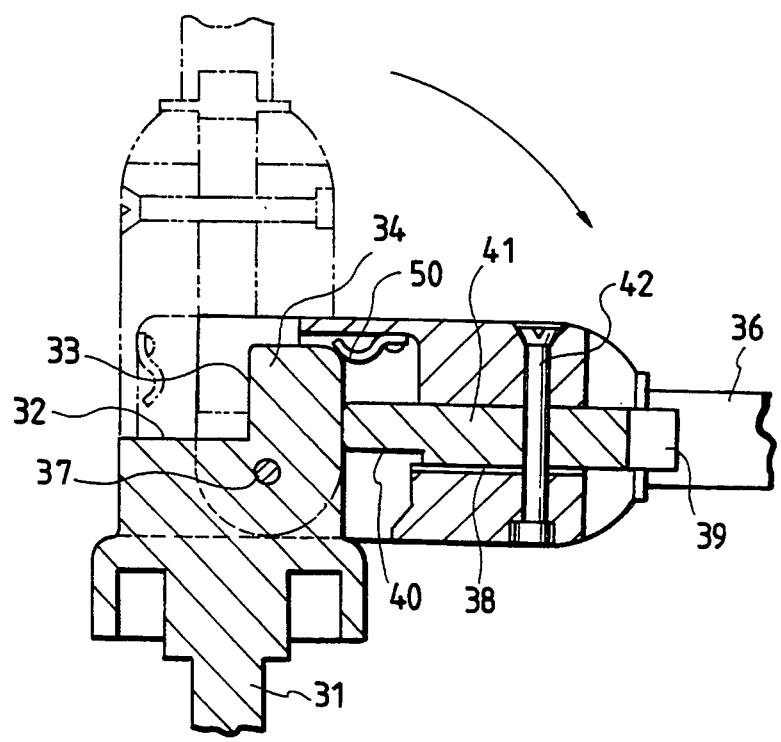
FIG. 14 is a cross-sectional view showing another modified embodiment of the handle folding device similar to the embodiment of FIG.11.
Figure 15:
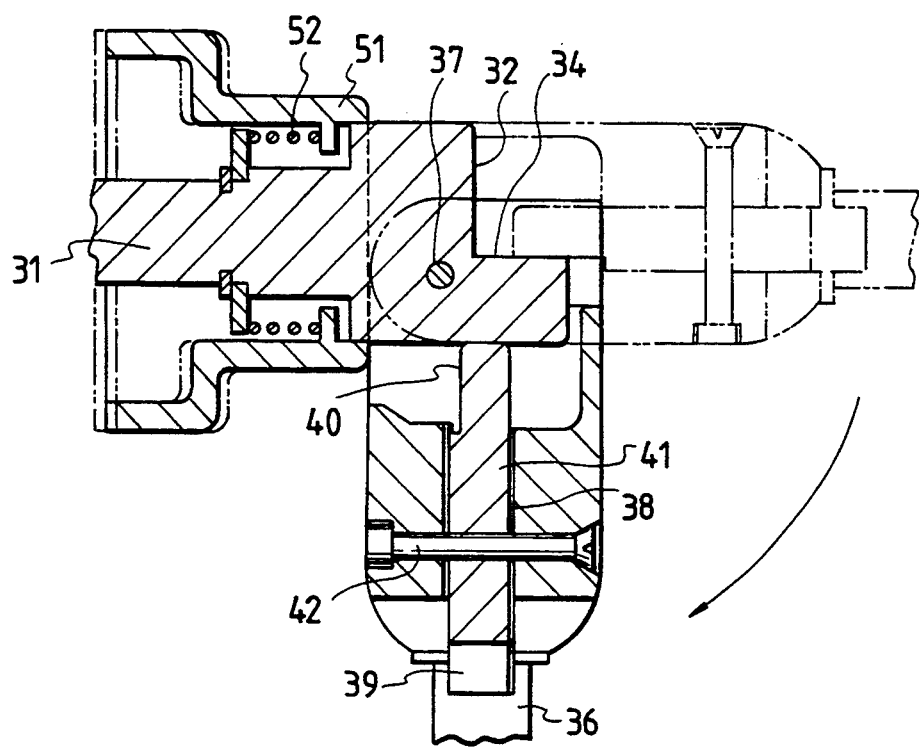
FIG. 15 is a cross-sectional view showing yet another modified embodiment of the handle folding device similar to the embodiment of FIG. 11.

Further, although the retaining of the handle arm relative to the handle shaft can be attained more positively in a case where the projection and the recess are used as a retaining means of the present invention, the handle folding device similar to the present invention can dispense with the provision of the retaining recess 46 in such a manner that the retaining member is arranged to directly depress either the handle shaft or the handle arm in order to retain the handle arm in its folded position. An example of such device is shown in FIG. 14, where an elastic retaining member 50 is secured to the handle arm 36 so as to directly depress the confronted projecting portion 34 of the handle shaft 31 and to retain the handle arm 36 in its folded position when the handle arm is pivoted to its folded position. Another example thereof is shown in FIG. 15, where a hollow cylindrical retaining member 51 is fitted onto the handle shaft 31 and biased by a spring 52 so as to depress sides of the fork-like spaced portions 36' and 36' of the handle arm 36 and to retain the handle arm 36 in its folded position when the handle arm 36 is pivoted to its folded position.

Since the handle arm can be surely retained in its folded position as well as in its up-standing position, the present invention produces many advantages in carrying the fishing reel by a fisherman, accommodating the fishing reel within a case in a manufacturing line, and so on.

In addition, the present invention is also applicable to a fishing reel where a handle arm is folded relative to a handle shaft in an imaginary plane defined by the handle shaft and the handle arm before being folded.

What is claimed is:

1. A handle folding device adapted to a fishing reel having a handle arm for manual rotation and a handle shaft for transmitting the manual rotation to a spool, said folding device comprising:
   means for allowing said handle arm to be pivoted between first and second positions relative to said handle shaft about a pivot axis, said pivot axis defining an axial direction;
   first means for retaining said handle arm only in said first position for use;
   second means for retaining said handle arm only in said second position, said second means includes a retaining member provided on one of said handle arm and said handle shaft, and a recess provided on the other of said handle arm and said handle shaft, said retaining member entering said recess only when said handle arm is pivoted to said second position; to provide positive locking engagement therewith; and
   wherein said retaining member is biased substantially in said axial direction with respect to said pivot axis.

2. The device according to claim 1, wherein said handle arm is retained in said second position following a pivot movement of said handle shaft from said first position to said second position.

3. The device according to claim 1, wherein said retaining member includes a handle stopper pivotably mounted on said handle arm and selectively engageable with said handle shaft to retain said handle arm in said first position.

4. The device according to claim 3, wherein said recess is formed on said handle shaft and selectively engageable with said handle stopper to retain said handle arm in said second position.

5. The device according to claim 1, wherein said retaining member includes a handle stopper slidably mounted on said handle arm and selectively engageable with said handle shaft to retain said handle arm in said first position.

6. The device according to claim 5, wherein said recess is formed on said handle shaft and selectively engageable with said handle stopper to retain said handle arm in said second position.

7. The device according to claim 1, wherein said retaining member includes a movable member movably mounted on said handle arm and selectively engageable with said handle shaft to retain said handle arm in said second position.

8. The device according to claim 7, further including a projection formed on said handle shaft and selectively engageable with said movable member to retain said handle arm in said second position.

9. The device according to claim 7, further including a projection formed on said handle shaft and said recess formed on said movable member, said projection and recess is being engageable with each other to retain said handle arm in said second position when said handle arm is pivoted to said second position.

10. The device according to claim 7, wherein said retaining member includes a frictional material attached to said movable member for retaining said handle arm in said second position by a frictional force thereof onto said handle shaft.

11. The device according to claim 7, wherein said retaining member includes a magnet and said recess includes a magnetized plate, respectively, attached to said movable member and said handle shaft for retaining said handle arm in said second position by a magnetic force thereof.

12. The device according to claim 1, wherein said retaining member is spring-biased.

13. The device according to claim 1, wherein said retaining member includes an elastic member secured to said handle arm and engageable with said handle shaft when said handle arm is pivoted to said second position.

14. The device according to claim 1, wherein said retaining member includes a spring-biased member mounted on said handle shaft, said member depressing said handle arm toward said second position.

15. A handle folding device for a fishing reel, comprising:
a handle shaft;
a projecting portion formed on one end of said handle shaft and provided with an engagement portion;
a handle arm pivotally supported onto said projecting portion;
a handle stopper pivotally mounted on said handle arm and selectively engaged with and disengaged from said engagement portion to allow said handle arm to be folded relative to said handle shaft; and
retaining means provided between said projecting portion and said handle stopper for retaining said handle arm in place when said handle arm is folded relative to said handle shaft to a folded position, wherein said retaining means comprises a projection and a recess for receiving said projection to provide positive locking engagement therewith, and wherein said handle stopper selectively disengages said projection from said recess, thereby allowing said handle arm to pivot from said folded position.

16. A handle folding device for a fishing reel, comprising:
a handle shaft;
a projecting portion formed on one end of said handle shaft, and provided with an engagement portion;
a handle arm pivotally supported onto said projecting portion;
a handle stopper pivotally mounted on said handle arm and selectively engaged with and disengaged from said engagement portion to allow said handle arm to be folded relative to said handle shaft; and
retaining means provided between said handle shaft and said handle arm for retaining said handle arm in place when said handle arm is folded relative to said handle shaft to said folded position, wherein said retaining means comprises a projection and a recess for receiving said projection to provide positive locking engagement therewith, and wherein said retaining means further comprises operating means for selectively disengaging said projection from said recess to allow said handle arm to be pivoted out of said folded position.

17. The device according to claim 16, wherein said projection comprises a spring biased movable member.

18. A handle folding device for a fishing reel having a handle arm for manual rotation and a handle shaft for transmitting the manual rotation to a spool, said folding device comprising:
a pivot pin interposed between and pivotally connecting said handle arm and said handle shaft;
projection means for securing said handle arm with respect to said handle shaft in one of a first, unfolded position and a second, folded position;
a dowel pivotally mounting said projection means with respect to a first one of said handle arm and said handle shaft, said pivot pin and said dowel are relatively orthogonally oriented;
a first recess on a second one of said handle arm and said handle shaft, said projection means engaging said first recess in said first position;
a second recess on said second one of said handle arm and said handle shaft, said projection means engaging said second recess in a positive locking manner in said second position; and,
operation means for selectively disengaging said projection means from said first recess and said second recess to allow said handle arm to be pivoted from said first position to said second position.

19. The handle folding device of claim 18, wherein each of said first recess and second recess define a planar wall adapted to contact said projection means.

* * * * *